United States Patent
Kim et al.

(10) Patent No.: US 12,276,555 B2
(45) Date of Patent: Apr. 15, 2025

(54) CONDUCTIVE YARN PRESSURE SENSOR WITH SENSING ELECTRODES PHYSICALLY OR ELECTRICALLY CONTACTING EACH OTHER THROUGH OPENINGS IN INTERMEDIATE LAYER IN REPONSE TO EXTERNAL PRESSURE

(71) Applicant: KOREA ELECTRONICS TECHNOLOGY INSTITUTE, Seongnam-si (KR)

(72) Inventors: Won Hyo Kim, Yongin-si (KR); Woo Kyeong Seong, Seongnam-si (KR); Kook Nyung Lee, Seoul (KR); Su Mi Yoon, Anyang-si (KR); Dong Ki Hong, Pyeongtaek-si (KR); Young Joo Kim, Seoul (KR); Hye Lim Kang, Chungcheongbuk-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 280 days.

(21) Appl. No.: 17/859,314

(22) Filed: Jul. 7, 2022

(65) Prior Publication Data
US 2022/0341797 A1    Oct. 27, 2022

Related U.S. Application Data

(63) Continuation of application No. PCT/KR2021/000166, filed on Jan. 7, 2021.

(30) Foreign Application Priority Data

Jan. 8, 2020    (KR) .................. 10-2020-0002658

(51) Int. Cl.
*G01L 1/22*    (2006.01)
*B32B 5/02*    (2006.01)
(Continued)

(52) U.S. Cl.
CPC ............ *G01L 1/2287* (2013.01); *B32B 5/024* (2013.01); *B32B 5/263* (2021.05); *B32B 7/14* (2013.01);
(Continued)

(58) Field of Classification Search
CPC ......... G01L 1/2287; G01L 1/146; G01L 1/18; G01L 1/205
See application file for complete search history.

(56) References Cited

U.S. PATENT DOCUMENTS 5,878,620 A * 3/1999 Gilbert ................... G01L 1/205
                                                73/172
8,800,386 B2 * 8/2014 Taylor ...................... G01L 1/18
                                                73/862.041
(Continued)

FOREIGN PATENT DOCUMENTS

CN          108593157 A    9/2018
KR    10-2012-0101312 A    9/2012
(Continued)

OTHER PUBLICATIONS

International Search Report mailed Apr. 7, 2021 in International Application No. PCT/KR2021/000166.

*Primary Examiner* — Tran M. Tran
(74) *Attorney, Agent, or Firm* — Knobbe, Martens, Olson & Bear, LLP

(57) ABSTRACT

A conductive yarn pressure sensor is proposed. The pressure sensor may include a porous fiber layer having predetermined cavities formed therein. The pressure sensor may also include a first sensing electrode made of a first conductive yarn formed on one surface of the porous fiber layer, and a second sensing electrode made of a second conductive yarn formed on the other surface of the porous fiber layer. The first sensing electrode or the second sensing electrode may be provided so as to be in contact with each other in the (Continued)

cavities of the porous fiber layer due to external pressure. According to an embodiment, by having conductive yarn in flexible clothing or textile material, pressure can be sensed by effectively responding to deformation due to external pressure.

11 Claims, 12 Drawing Sheets

(51) Int. Cl.
  *B32B 5/26* (2006.01)
  *B32B 7/14* (2006.01)
  *D03D 1/00* (2006.01)
  *D03D 15/533* (2021.01)

(52) U.S. Cl.
  CPC ......... *D03D 1/0088* (2013.01); *D03D 15/533* (2021.01); *B32B 2250/20* (2013.01); *B32B 2307/202* (2013.01); *B32B 2457/00* (2013.01)

(56) References Cited

U.S. PATENT DOCUMENTS

| | | | | |
|---|---|---|---|---|
| 9,671,297 | B2* | 6/2017 | Sibbett | G06F 3/045 |
| 10,429,252 | B1* | 10/2019 | Squeri | G01L 9/12 |
| 10,458,864 | B1* | 10/2019 | Keller | G06F 3/014 |
| 10,658,567 | B2* | 5/2020 | Merrell | G01L 1/18 |
| 10,684,719 | B2* | 6/2020 | Yeo | G06F 3/045 |
| 10,936,137 | B2* | 3/2021 | Lee | G06F 3/045 |
| 11,391,639 | B2* | 7/2022 | Li | G01L 1/18 |
| 2012/0162122 | A1* | 6/2012 | Geaghan | G01L 1/205 |
| | | | | 702/41 |
| 2017/0234673 | A1* | 8/2017 | Sibbett | G01L 1/205 |
| | | | | 73/777 |

FOREIGN PATENT DOCUMENTS

| | | |
|---|---|---|
| KR | 10-2017-0107161 A | 9/2017 |
| KR | 10-2018-0053133 A | 5/2018 |
| KR | 10-2018-0117889 A | 10/2018 |
| KR | 10-2018-0117893 A | 10/2018 |

* cited by examiner

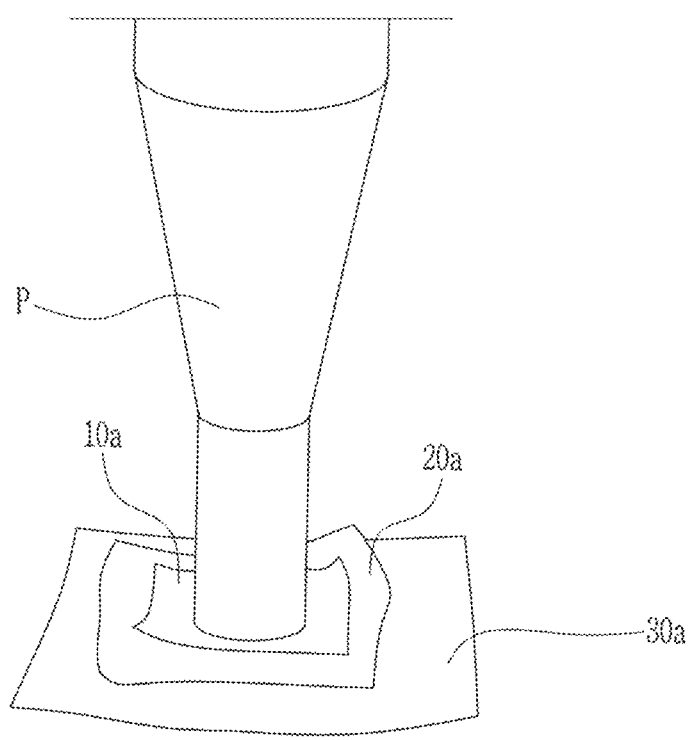

CONDUCTIVE YARN PRESSURE SENSOR WITH SENSING ELECTRODES PHYSICALLY OR ELECTRICALLY CONTACTING EACH OTHER THROUGH OPENINGS IN INTERMEDIATE LAYER IN REPONSE TO EXTERNAL PRESSURE

CROSS REFERENCE TO RELATED APPLICATIONS

This is a continuation application of International Patent Application No. PCT/KR2021/000166, filed on Jan. 7, 2021, which claims priority to Korean Patent Application No. 10-2020-0002658 filed on Jan. 8, 2020, contents of both of which are incorporated herein by reference in their entireties.

BACKGROUND

Technical Field

An embodiment of the present disclosure relates to a conductive yarn pressure sensor.

Description of Related Technology

Pressure sensors are bonded onto the flat surface of a general substrate or a base member in the form of a thin film, and respond to contraction and relaxation caused by deformation of the base member, thereby sensing the extent of bending or deformation of the base member.

SUMMARY

An object of an embodiment of the present disclosure is to provide a conductive yarn pressure sensor, which is flexible and thus effectively applicable to clothing or various other kinds of flexible items or devices and effectively senses the pressure applied thereto.

In addition, an embodiment of the present disclosure provides a conductive yarn pressure sensor capable not only of sensing pressure using a conductive yarn but also of sensing both the position and the area of pressure applied to a flat surface.

A conductive yarn pressure sensor according to a first embodiment of the present disclosure includes a porous fiber layer having predetermined pores formed therein, a first sensing electrode formed on one surface of the porous fiber layer and including first conductive yarns, and a second sensing electrode formed on the other surface of the porous fiber layer and including second conductive yarns. The first sensing electrode and the second sensing electrode are brought into contact with each other through the pores in the porous fiber layer by external pressure.

Here, the first sensing electrode may include a plurality of first unit sensing electrodes extending in one direction and formed to be insulated from each other, and each of the plurality of first unit sensing electrodes may include a plurality of first conductive yarns formed on one surface of the porous fiber layer so as to extend in one direction and disposed densely and parallel to each other. The second sensing electrode may include a plurality of second unit sensing electrodes extending in another direction and formed to be insulated from each other, and each of the plurality of second unit sensing electrodes may include a plurality of second conductive yarns formed on the other surface of the porous fiber layer so as to extend in another direction and disposed densely and parallel to each other. The first unit sensing electrodes and the second unit sensing electrodes may overlap each other such that the longitudinal direction of the first unit sensing electrodes and the longitudinal direction of the second unit sensing electrodes intersect each other.

In addition, each of the plurality of first unit sensing electrodes of the first sensing electrode may be electrically connected to a separate independent power source, and each of the plurality of second unit sensing electrodes of the second sensing electrode may be electrically connected to a separate independent power source.

A conductive yarn pressure sensor according to a second embodiment of the present disclosure includes an adhesive member having predetermined spaces formed therein, a first sensing electrode formed on one surface of the adhesive member and including conductive yarns, and a second sensing electrode formed on the other surface of the adhesive member and including conductive yarns. The first sensing electrode and the second sensing electrode are brought into contact with each other in the spaces in the adhesive member by external pressure.

Here, the first sensing electrode may include a plurality of first unit sensing electrodes extending in one direction and formed to be insulated from each other, and each of the plurality of first unit sensing electrodes may include a plurality of conductive yarns formed on one surface of the adhesive member so as to extend in one direction and disposed densely and parallel to each other. The second sensing electrode may include a plurality of second unit sensing electrodes extending in another direction and formed to be insulated from each other, and each of the plurality of second unit sensing electrodes may include a plurality of conductive yarns formed on the other surface of the adhesive member so as to extend in another direction and disposed densely and parallel to each other. The first unit sensing electrodes and the second unit sensing electrodes may overlap each other such that the longitudinal direction of the first unit sensing electrodes and the longitudinal direction of the second unit sensing electrodes intersect each other in regions corresponding to the spaces.

In addition, each of the plurality of first unit sensing electrodes of the first sensing electrode may be electrically connected to a separate independent power source, and each of the plurality of second unit sensing electrodes of the second sensing electrode may be electrically connected to a separate independent power source.

In addition, each of the spaces in the adhesive member may be formed in the shape of a square having a size of 0.4 cm to 0.5 cm and a height of 0.4 mm to 0.5 mm in the thickness direction, and each of the first sensing electrode and the second sensing electrode may have an overall thickness of 0.4 mm to 0.5 mm.

A conductive yarn pressure sensor according to a third embodiment of the present disclosure includes a conductive film, a first adhesive member formed on one surface of the conductive film and having predetermined spaces formed therein, a second adhesive member formed on the other surface of the conductive film and having predetermined spaces formed therein, a first sensing electrode formed on one surface of the first adhesive member and including conductive yarns, and a second sensing electrode formed on one surface of the second adhesive member and including conductive yarns. The first sensing electrode or the second sensing electrode is brought into contact with the conductive film in the spaces in the adhesive member by external pressure.

Here, the first sensing electrode may include a plurality of first unit sensing electrodes extending in one direction and formed to be insulated from each other, and each of the plurality of first unit sensing electrodes may include a plurality of conductive yarns formed on one surface of the first adhesive member so as to extend in one direction and disposed densely and parallel to each other. The second sensing electrode may include a plurality of second unit sensing electrodes extending in another direction and formed to be insulated from each other, and each of the plurality of second unit sensing electrodes may include a plurality of conductive yarns formed on one surface of the second adhesive member so as to extend in another direction and disposed densely and parallel to each other. The first unit sensing electrodes and the second unit sensing electrodes may overlap each other such that the longitudinal direction of the first unit sensing electrodes and the longitudinal direction of the second unit sensing electrodes intersect each other in regions corresponding to the spaces.

In addition, each of the plurality of first unit sensing electrodes of the first sensing electrode may be electrically connected to a separate independent power source, and each of the plurality of second unit sensing electrodes of the second sensing electrode may be electrically connected to a separate independent power source.

The features and advantages of the present disclosure will become more obvious from the description made below in detail with reference to the accompanying drawings.

Before explaining embodiments of the present disclosure, it is to be understood that the phraseology and terminology used in the following specification and appended claims should not be construed as being limited to general or dictionary meanings but should be construed as having meanings and concepts according to the spirit of the present disclosure on the basis of the principle that the inventor is permitted to appropriately define terms for the best explanation.

According to an embodiment of the present disclosure, a pressure sensor is capable of being applied to clothing or a textile item, which is flexible, using conductive yarns, thereby effectively responding to deformation caused by external pressure and sensing the pressure.

In addition, since the conductive yarns are disposed so as to correspond to the X-axis direction and the Y-axis direction of a plane and are individually connected to respective power sources, it is possible not only to sense pressure through a change in resistance due to external pressure but also to effectively sense the position of the point at which the pressure is applied.

In addition, the conductive yarns may be disposed so as to be brought into direct contact with each other, or a conductive film may be provided in the contact area between the conductive yarns, whereby a change in resistance may be amplified by contact between the conductive yarns and the conductive film, and consequently, the sensitivity of the pressure sensor may be effectively improved.

In addition, a unit pressure sensor may be formed by attaching the conductive yarns to an adhesive member, which has predetermined pores formed therein. Accordingly, the pressure sensor may be disposed on or applied to clothing or various other kinds of flexible items or devices in various manners, thereby exhibiting highly reliable sensing of pressure across various fields.

BRIEF DESCRIPTION OF THE DRAWINGS

FIG. 14 is a partially enlarged view of FIG. 13.

DETAILED DESCRIPTION

Figure 1A:
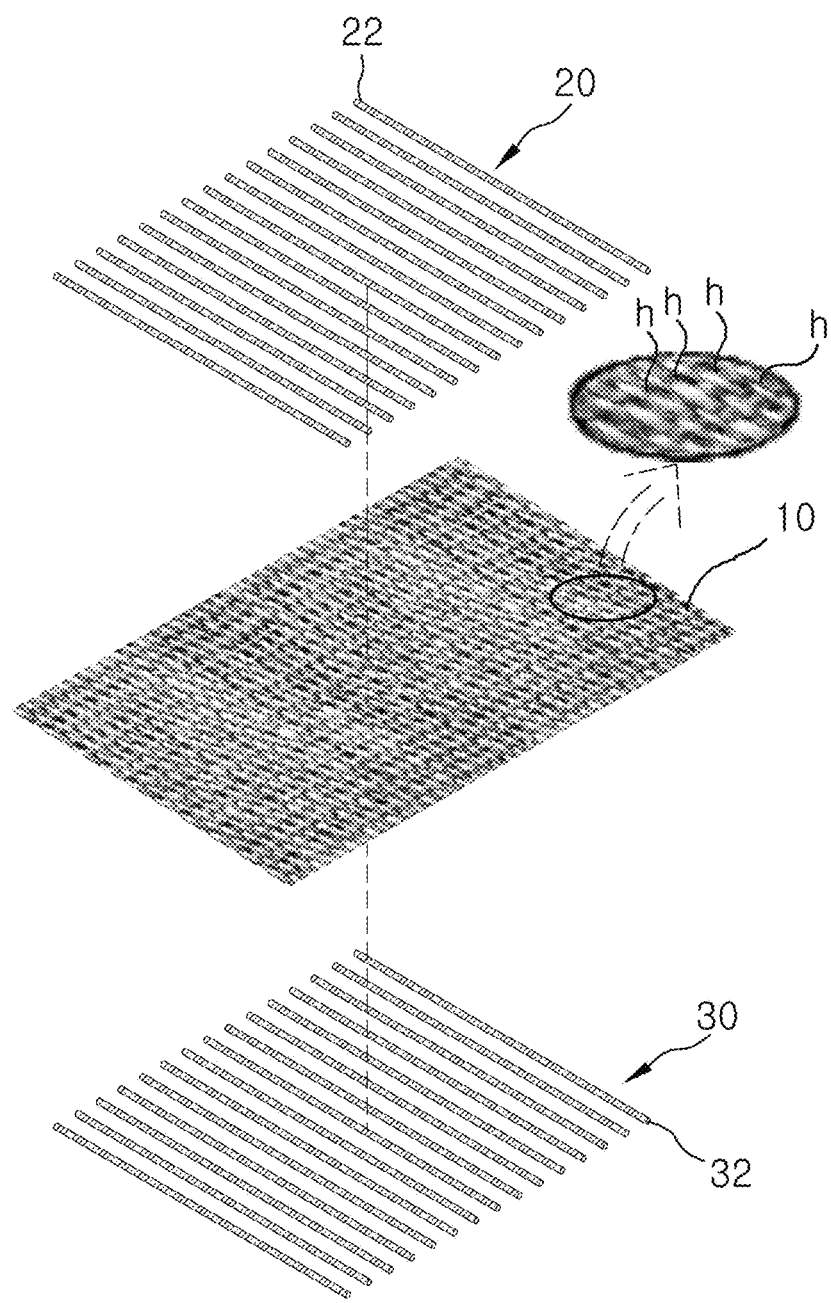
FIG. 1A is an exploded perspective view of a conductive yarn pressure sensor according to a first embodiment of the present disclosure.

In recent years, it has become increasingly common to attach a sensor to various kinds of base members, such as general flexible substrates, textile items, or other more flexible items, and accordingly, there is great demand for research on a pressure sensor capable of effectively responding to deformation of the sensor itself, thereby increasing freedom of design.

Objects, specific advantages, and novel features of the present disclosure will be apparent from the exemplary embodiments and the following detailed description in connection with the accompanying drawings. It should be noted that when reference numerals are assigned to the elements of the drawings, the same reference numerals are assigned to the same elements even when they appear in different drawings. Furthermore, although the terms "one surface", "the other surface", "first", "second", etc. are used herein to describe various elements, these elements are not to be construed as being limited by these terms. These terms are generally only used to distinguish one element from another. In the following description of the present disclosure, a detailed description of known functions and configurations incorporated herein will be omitted when it may obscure the subject matter of the present disclosure.

Hereinafter, an embodiment of the present disclosure will be described in detail with reference to the accompanying drawings. The same reference numerals designate the same elements.

Figure 1B:
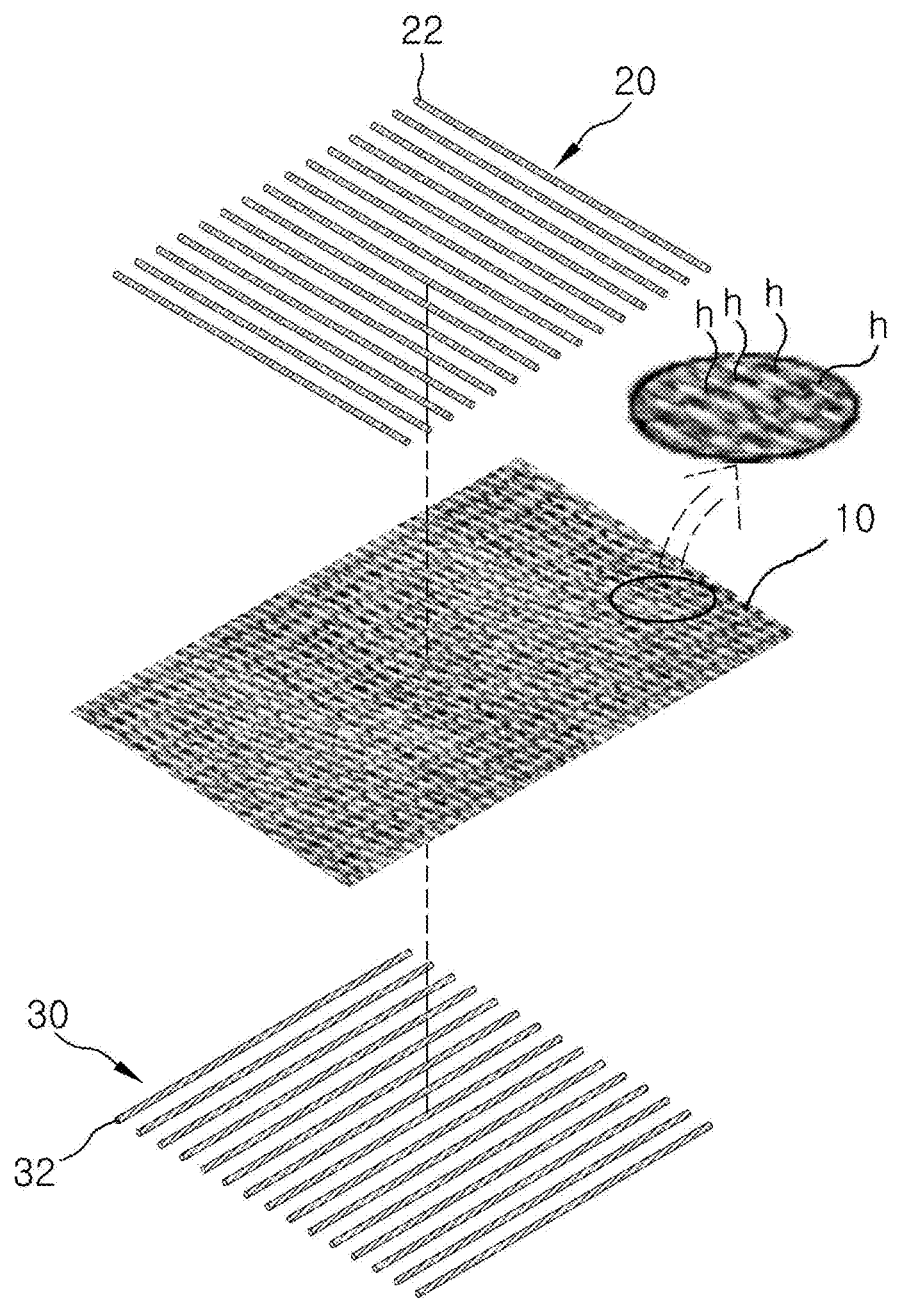
FIG. 1B is an exploded perspective view of another example of the conductive yarn pressure sensor according to the first embodiment of the present disclosure.
Figure 2:
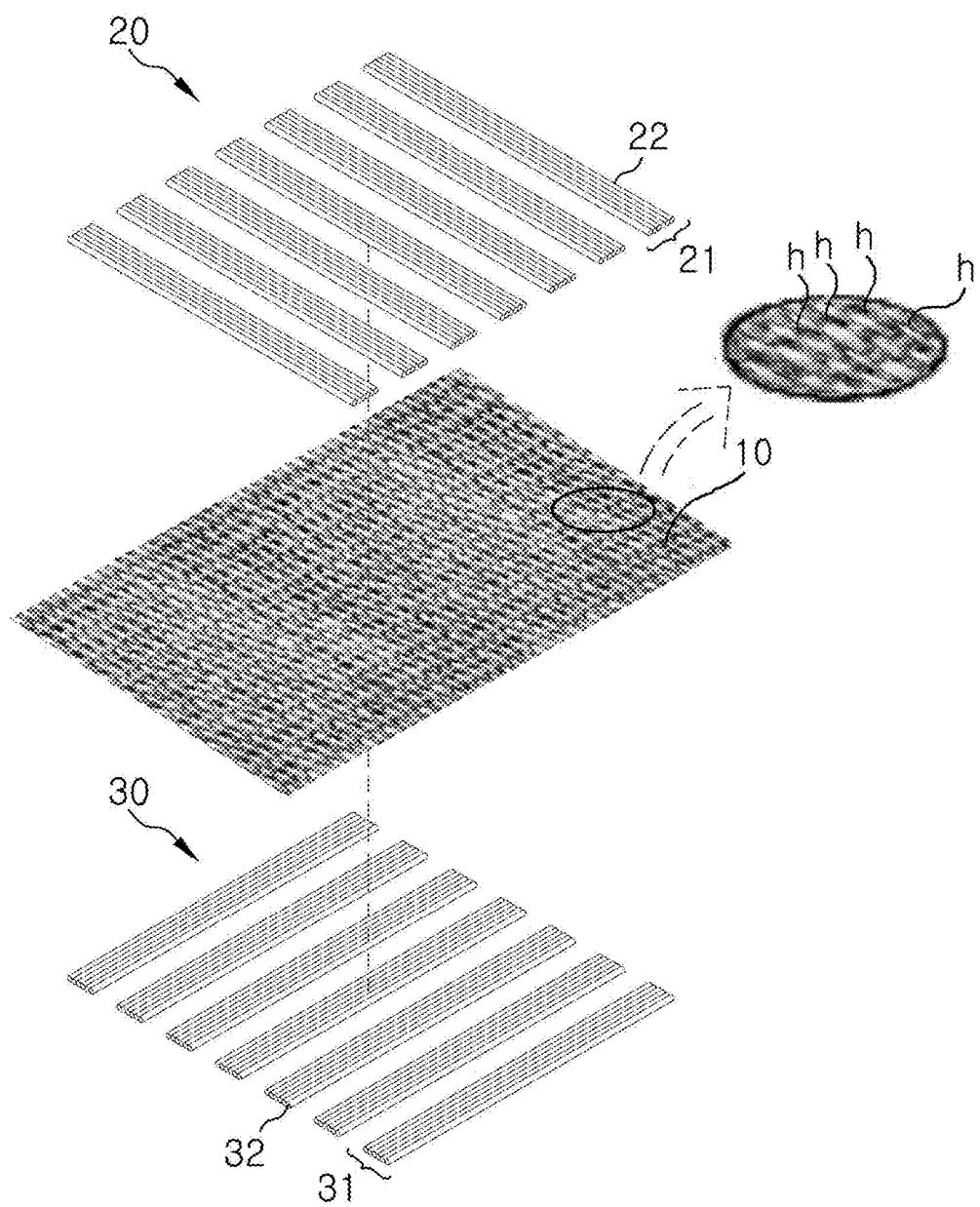
FIG. 2 is an exploded perspective view of still another example of the conductive yarn pressure sensor according to the first embodiment of the present disclosure.
Figure 3:
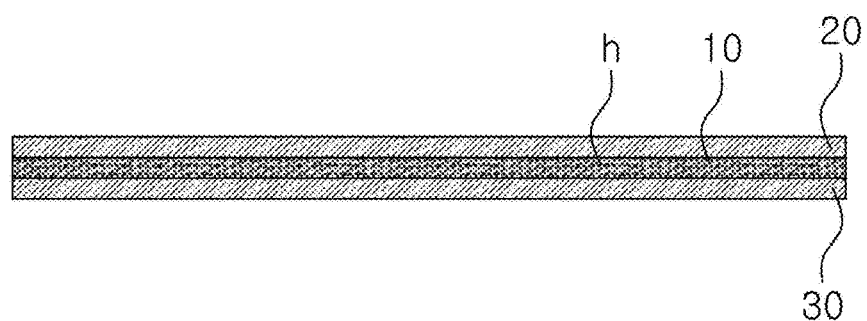
FIG. 3 is a cross-sectional view of the conductive yarn pressure sensor according to the first embodiment of the present disclosure.
Figure 4:
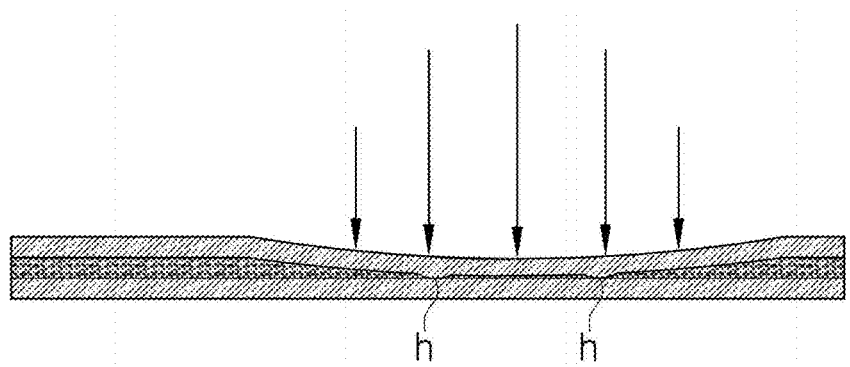
FIG. 4 is a cross-sectional view showing the action of the conductive yarn pressure sensor according to the first embodiment of the present disclosure.
Figure 5:
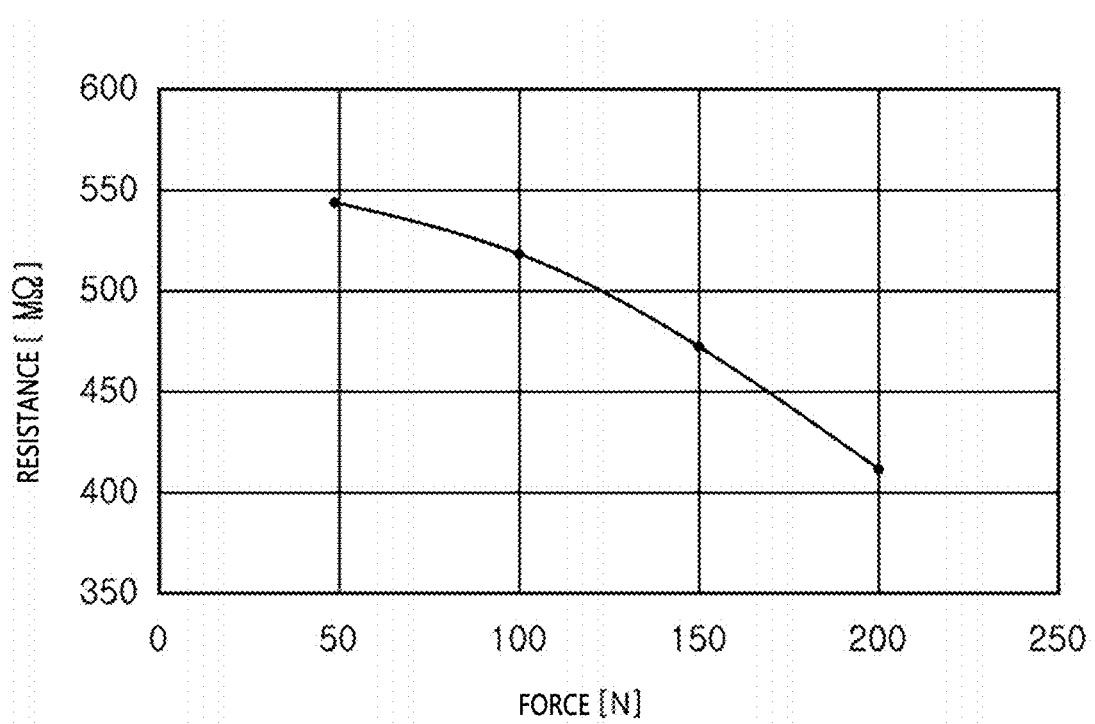
FIG. 5 shows data of experimentation for obtaining a change in resistance value when the conductive yarn pressure sensor according to the first embodiment of the present disclosure senses pressure.
Figure 13:
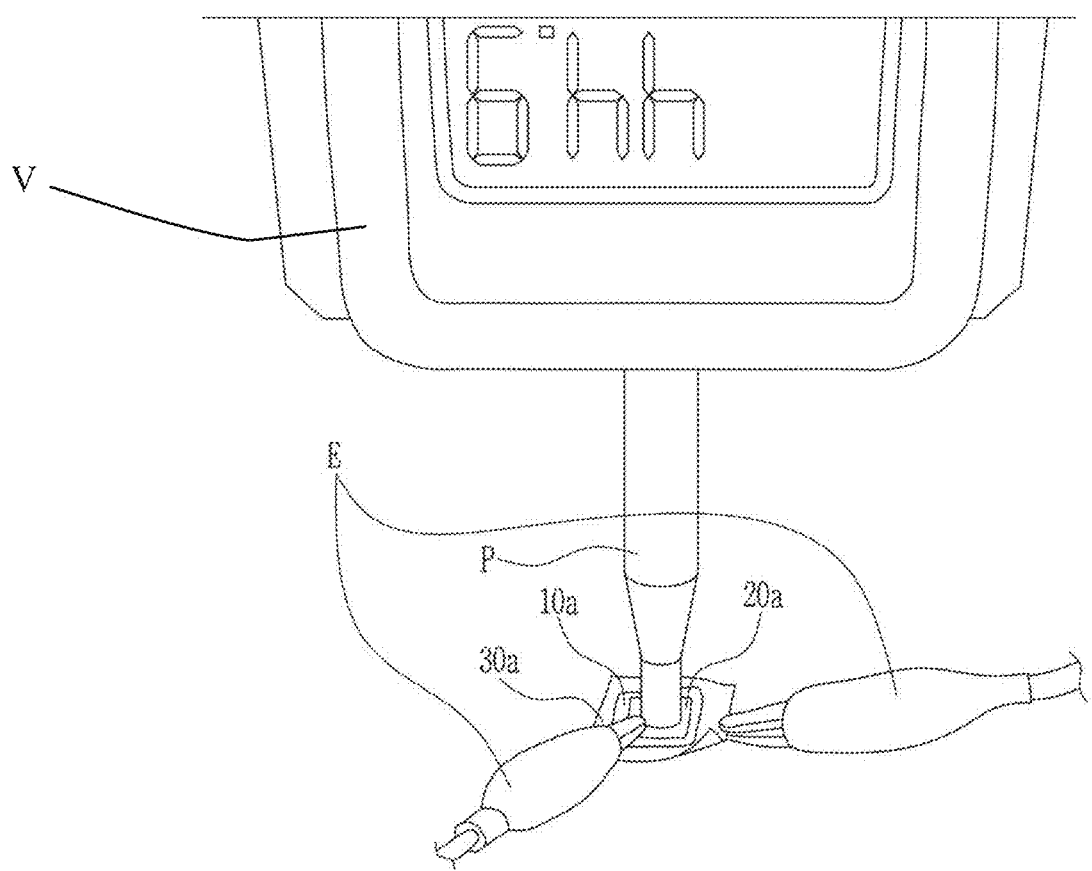
FIG. 13 is a picture of experimentation equipment used to obtain the data of FIG. 5 of the first embodiment of the present disclosure.

FIG. 1A is an exploded perspective view of a conductive yarn pressure sensor according to a first embodiment of the present disclosure, FIG. 1B is an exploded perspective view of another example of the conductive yarn pressure sensor according to the first embodiment of the present disclosure, FIG. 2 is an exploded perspective view of still another example of the conductive yarn pressure sensor according to the first embodiment of the present disclosure, FIG. 3 is a cross-sectional view of the conductive yarn pressure sensor according to the first embodiment of the present disclosure, FIG. 4 is a cross-sectional view showing the action of the conductive yarn pressure sensor according to the first embodiment of the present disclosure, FIG. 5 shows data of experimentation for obtaining a change in resistance value when the conductive yarn pressure sensor according to the first embodiment of the present disclosure senses pressure, FIG. 13 is a picture of experimentation equipment used to obtain the data of FIG. 5 of the first embodiment of the present disclosure, and FIG. 14 is a partially enlarged view of FIG. 13.

The conductive yarn sensor according to the first embodiment of the present disclosure includes a porous fiber layer 10, which has predetermined pores formed therein, a first sensing electrode 20, which is formed on one surface of the porous fiber layer 10 and includes first conductive yarns 22, and a second sensing electrode 30, which is formed on the other surface of the porous fiber layer and includes second conductive yarns 32. The first sensing electrode and the second sensing electrode 30 are brought into contact with each other through the pores in the porous fiber layer 10 by external pressure.

As shown in FIG. 1A, the conductive yarn pressure sensor according to the first embodiment of the present disclosure is configured such that the first sensing electrode 20 including the first conductive yarns 22 is formed on one surface of the porous fiber layer 10 and the second sensing electrode 30 including the second conductive yarns 32 is formed on the other surface of the porous fiber layer 10.

The porous fiber layer 10 includes fabric or fiber for general clothing. The term "porous" means that pores, which are naturally formed when yarns of a general textile material are woven sparsely, are present. The first sensing electrode 20 formed on the fiber layer and the second sensing electrode 30 formed under the fiber layer are brought into contact with each other through the pores by pressure, whereby a change in resistance, i.e. a reduction in resistance, is sensed, and accordingly, pressure is sensed. When pressure increases, the contact area increases in proportion thereto, and the extent of decrease in resistance increases in proportion to the increase in the contact area. In this way, it is possible to sense the increase in pressure.

Although a plurality of conductive yarns is illustrated in FIG. 1A as being spaced apart from each other, the first sensing electrode 20 or the second sensing electrode 30 may be formed such that a plurality of first conductive yarns 22 or a plurality of second conductive yarns 32 is disposed so as to be in contact with each other to form a surface. Since a plurality of conductive yarns is provided, when the porous fiber layer 10 is deformed by external pressure, individual conductive yarns are flexibly deformed, whereby the pressure sensor is capable of sensing pressure while effectively responding to deformation of the fiber layer without being broken or damaged.

As shown in FIG. 1A, a plurality of first conductive yarns 22, which extend in one direction, and a plurality of second conductive yarns 32, which extend in the same direction as the longitudinal direction of the first conductive yarns 22, are coupled to the porous fiber layer 10, thereby implementing the conductive yarn pressure sensor.

Alternatively, as shown in FIG. 1B, the first conductive yarns 22 and the second conductive yarns 32 are formed such that the longitudinal directions thereof intersect each other, and thus form coordinate axes, i.e. an X-axis and a Y-axis, thereby making it possible not only to sense pressure through a change in resistance due to external pressure but also to sense the position of the point at which the pressure is applied by external force. In this case, as illustrated, the first conductive yarns 22 are spaced closely apart from and insulated from each other, and the second conductive yarns 32 are spaced closely apart from and insulated from each other, thereby effectively sensing the specific position at which pressure is applied in the intersection regions between the first conductive yarns and the second conductive yarns through a change in capacitance.

Alternatively, as shown in FIG. 2, as a modification of the first embodiment of the present disclosure, the first sensing electrode 20 includes a plurality of first unit sensing electrodes 21, which extend in one direction and are insulated from each other. Each of the first unit sensing electrodes 21 includes a plurality of first conductive yarns 22, which are formed on one surface of the porous fiber layer 10 so as to extend in one direction and are disposed densely and parallel to each other. The second sensing electrode 30 includes a plurality of second unit sensing electrodes 31, which extend in another direction and are insulated from each other. Each of the second unit sensing electrodes 31 includes a plurality of second conductive yarns 32, which are formed on the other surface of the porous fiber layer 10 so as to extend in another direction and are disposed densely and parallel to each other. The longitudinal direction of the first unit sensing electrodes 21 and the longitudinal direction of the second unit sensing electrodes 31 may intersect each other so that the first and second unit sensing electrodes overlap each other.

Here, each of the plurality of first unit sensing electrodes 21 of the first sensing electrode 20 is independently connected to a power source, and each of the plurality of second unit sensing electrodes 31 of the second sensing electrode 30 is independently connected to a power source, thereby making it possible to sense not only a change in resistance but also the position of the point at which pressure is applied when the first sensing electrode 20 and the second sensing electrode 30 are brought into contact with each other by external pressure. Accordingly, the pressure sensor is applicable to devices in various fields, and thus the function thereof may expand.

Although each of the first unit sensing electrode 21 and the second unit sensing electrode 31 is illustrated as being formed by coupling a plurality of conductive yarns to each other, the same may be implemented as a single independent conductive yarn having a predetermined thickness.

In detail, as shown in FIGS. 3 and 4, when pressure (force) is applied to the conductive yarn pressure sensor from above, the conductive yarn pressure sensor is naturally pressed downwards, and the first sensing electrode 20 and the second sensing electrode 30 are brought into contact with each other through predetermined pores in the porous fiber layer 10. This contact causes a change in resistance, thus making it possible to sense a pressure value based thereon.

FIG. 5 is a graph showing the result of experimentation performed using a practical sample.

As can be seen from the experimentation shown in FIGS. 13 and 14, when the overall thickness of a specimen 20a corresponding to the first sensing electrode 20 is set to 0.1 mm, when the overall thickness of a specimen 30a corresponding to the second sensing electrode 30 is set to 0.1 mm, when the overall thickness of a specimen 10a corresponding to the intermediate porous fiber layer 10 is set to 0.1 mm, and when force is applied to the specimen 20a from above using a pressing bar P, the specimen 20a and the specimen 30a are brought into contact with each other through a plurality of fine pores in the specimen 10a, which is the porous fiber layer, and a change in resistance is measured using a resistance-measuring device V. The result of measurement is indicated in the graph shown in FIG. 5. That is, it can be seen that, when pressing force increases and thus the contact area between the specimen 20a and the specimen 30a increases, the resistance value decreases in inverse proportion thereto.

As a result, it can be seen that, when the amount of external pressure applied thereto increases, the contact area between the first sensing electrode 20 and the second sensing electrode 30 gradually increases, and the resistance value decreases in inverse proportion thereto.

Figure 6:
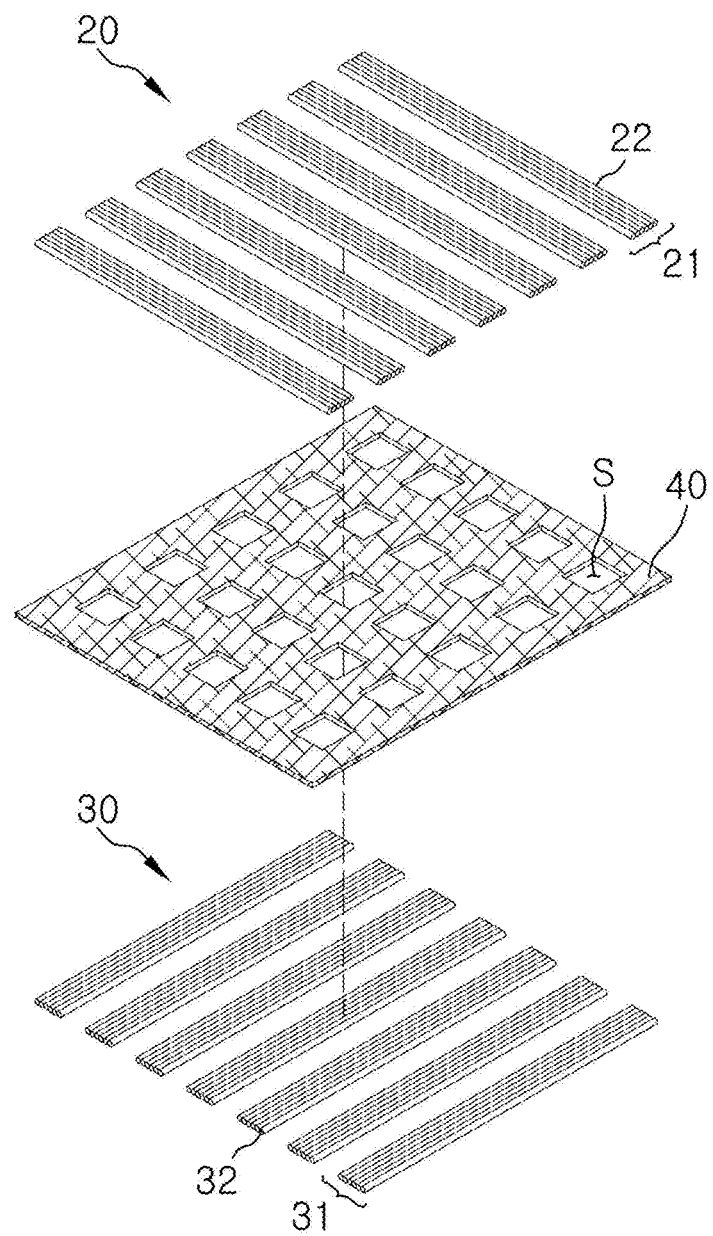
FIG. 6 is an exploded perspective view of a conductive yarn pressure sensor according to a second embodiment of the present disclosure.
Figure 7:
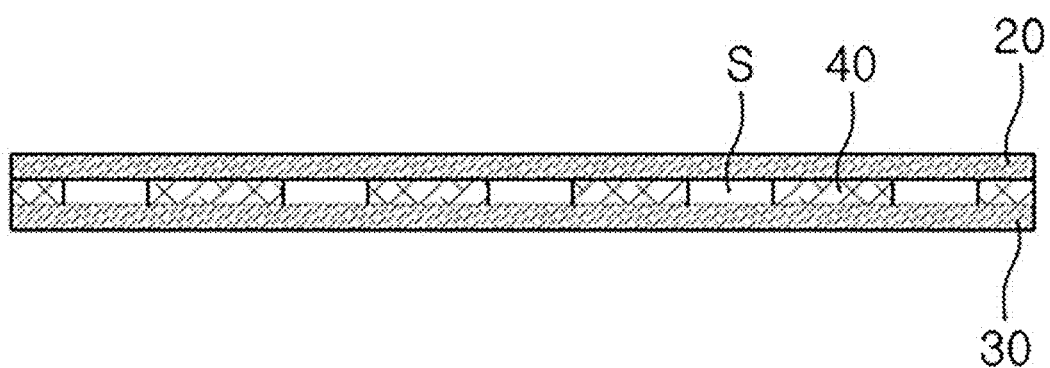
FIG. 7 is a cross-sectional view of the conductive yarn pressure sensor according to the second embodiment of the present disclosure.
Figure 8:
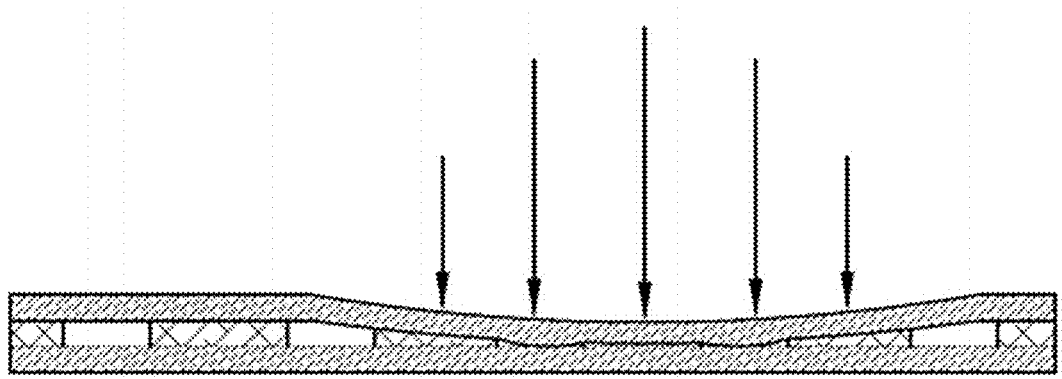
FIG. 8 is a cross-sectional view showing the action of the conductive yarn pressure sensor according to the second embodiment of the present disclosure.
Figure 9:
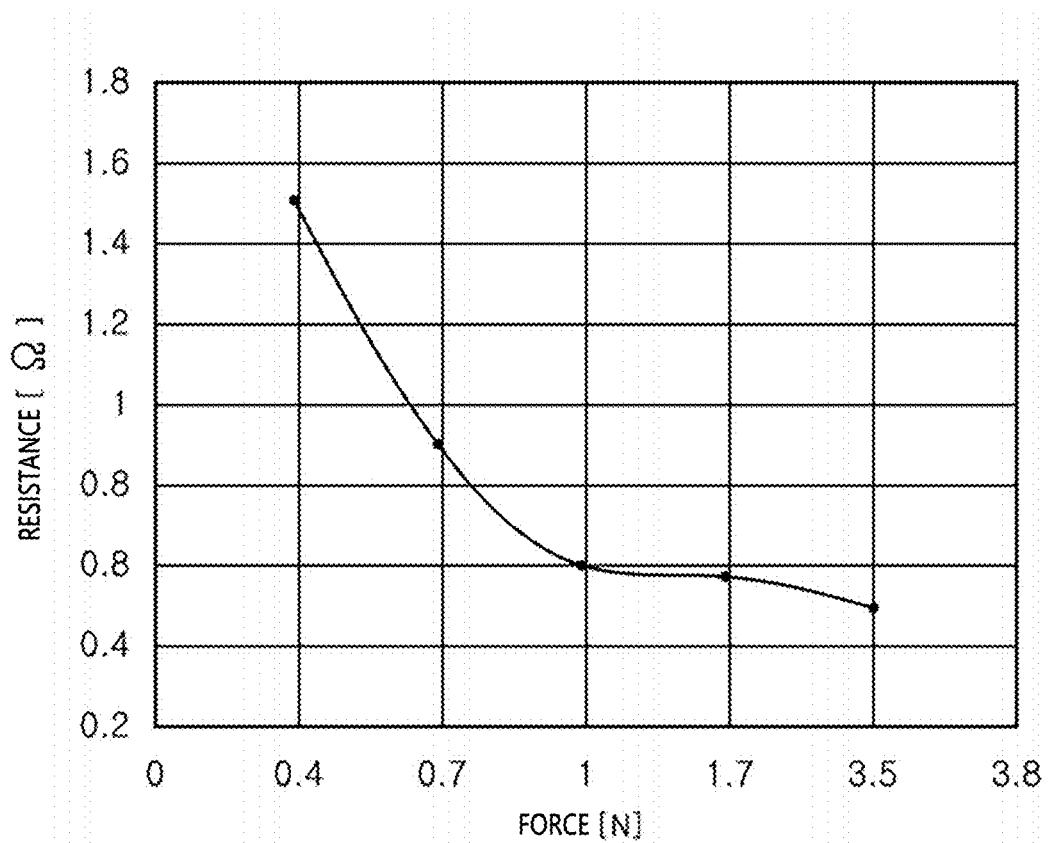
FIG. 9 shows data obtained through experimentation to determine a change in resistance value when the conductive yarn pressure sensor according to the second embodiment of the present disclosure senses pressure.

FIG. 6 is an exploded perspective view of a conductive yarn pressure sensor according to a second embodiment of the present disclosure, FIG. 7 is a cross-sectional view of the conductive yarn pressure sensor according to the second embodiment of the present disclosure, FIG. 8 is a cross-sectional view showing the action of the conductive yarn pressure sensor according to the second embodiment of the present disclosure, and FIG. 9 shows data obtained through experimentation to determine a change in resistance value when the conductive yarn pressure sensor according to the second embodiment of the present disclosure senses pressure.

The conductive yarn pressure sensor according to the second embodiment of the present disclosure includes an adhesive member 40, which has predetermined spaces formed therein, a first sensing electrode 20, which is formed on one surface of the adhesive member 40 and includes conductive yarns, and a second sensing electrode 30, which is formed on the other surface of the adhesive member 40 and includes conductive yarns. The first sensing electrode and the second sensing electrode 30 are brought into contact with each other in the spaces in the adhesive member 40 by external pressure.

As shown in FIG. 6, the first sensing electrode 20 is coupled to one surface of the adhesive member 40, which has the spaces formed therein, and the second sensing electrode 30 is coupled to the other surface of the adhesive member 40. Since the first sensing electrode 20 and the second sensing electrode 30 are substantially the same as the first sensing electrode 20 and the second sensing electrode 30 according to the first embodiment described above, duplicate descriptions thereof will be omitted.

As shown in FIG. 6, the first sensing electrode 20 includes a plurality of first unit sensing electrodes 21, which extend in one direction and are insulated from each other. Each of the first unit sensing electrodes 21 includes a plurality of conductive yarns, which are formed on one surface of the adhesive member 40 so as to extend in one direction and are disposed densely and parallel to each other. The second sensing electrode 30 includes a plurality of second unit sensing electrodes 31, which extend in another direction and are insulated from each other. Each of the second unit sensing electrodes 31 includes a plurality of conductive yarns, which are formed on the other surface of the adhesive member 40 so as to extend in another direction and are disposed densely and parallel to each other. The longitudinal direction of the first unit sensing electrodes 21 and the longitudinal direction of the second unit sensing electrodes 31 may intersect each other so that the first and second unit sensing electrodes overlap each other in regions corresponding to the spaces.

In the illustrated embodiment, the plurality of first unit sensing electrodes 21 of the first sensing electrode 20 is connected to an independent power source, and the plurality of second unit sensing electrodes 31 of the second sensing electrode 30 is also connected to an independent power source, thereby making it possible not only to achieve a basic pressure-sensing function but also to sense the point at which pressure is actually applied by determining the position of contact between sensing electrodes that intersect each other. Substantially identical to the first embodiment, the second embodiment may alternatively be configured such that a plurality of conductive yarns of the first sensing electrode 20, which is an upper electrode, are disposed so as to be in contact with each other in the lateral direction to form a surface and such that a plurality of conductive yarns of the second sensing electrode 30, which is a lower electrode, are disposed so as to be in contact with each other in the lateral direction to form a surface.

The adhesive member 40 may be made of a typical insulating material, and may be formed in a sheet shape. The adhesive member 40 may be formed in such a manner that an adhesive material or the like is applied to the surface thereof that faces any one of the first sensing electrode 20 and the second sensing electrode 30 so that the spaces are patterned thereon.

As shown in FIGS. 7 and 8, when pressure is applied to the conductive yarn sensor according to the second embodiment from above, the first sensing electrode 20 and the second sensing electrode 30 are naturally brought into contact with each other in the spaces, and thus the resistance value changes.

In detail, the behavior of the embodiment can be confirmed from the graph shown in FIG. 9, which indicates the result of experimentation performed under predetermined conditions. Similar to the first embodiment of the present disclosure described above, a change in resistance value caused by external pressure is measured using specimens corresponding to the respective components of the sensor and using the same experimentation equipment as shown in FIG. 13. The graph indicates a change in resistance value measured under conditions that the overall thickness of each of the first sensing electrode 20 and the second sensing electrode 30 is set to 0.45 mm, the overall thickness of the adhesive layer is also set to 0.45 mm, and each of the spaces is formed in the shape of a square having a size of 0.45 cm and a depth of 0.4 mm in the thickness direction thereof. As shown, it can be seen that, when pressure increases, the resistance value generated by contact between the first sensing electrode 20 and the second sensing electrode 30 gradually decreases. Based on this change in resistance value, it is possible to effectively sense the applied pressure.

Figure 10:
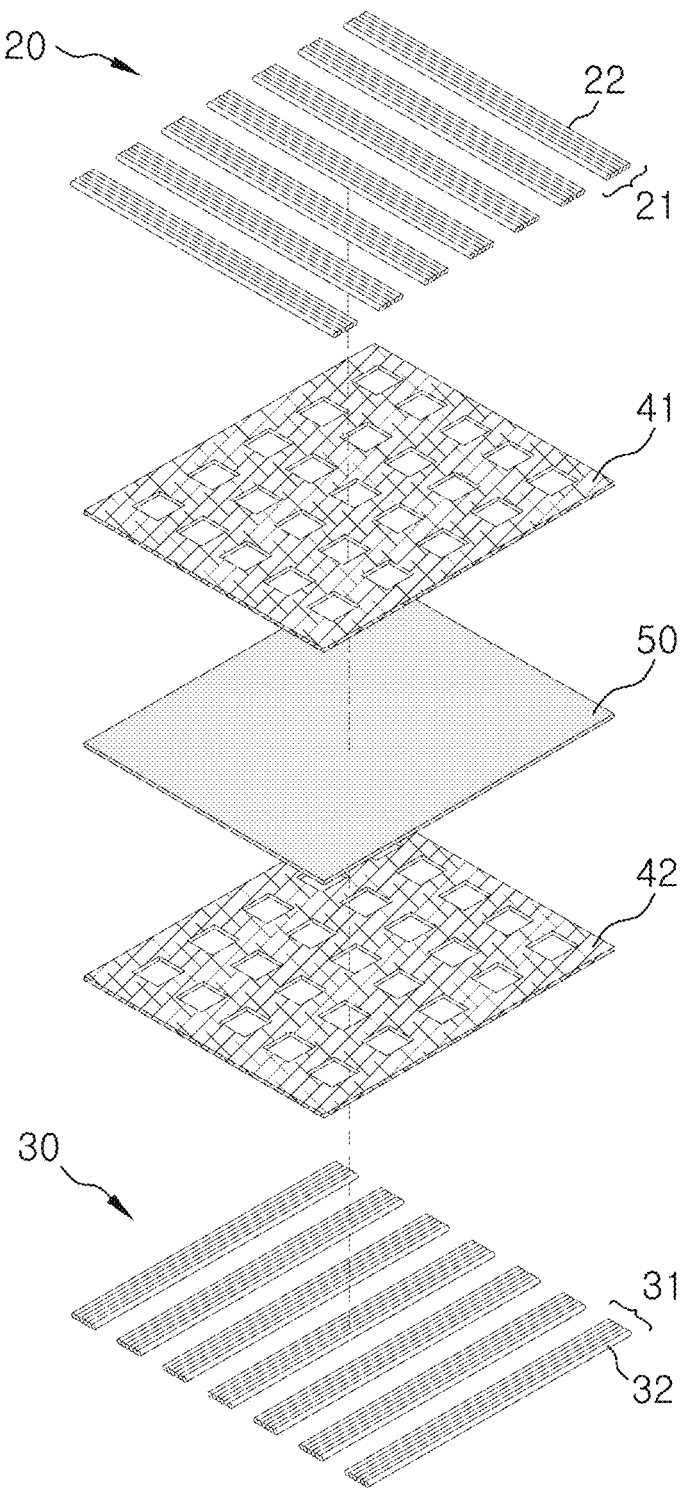
FIG. 10 is an exploded perspective view of a conductive yarn pressure sensor according to a third embodiment of the present disclosure.
Figure 11:
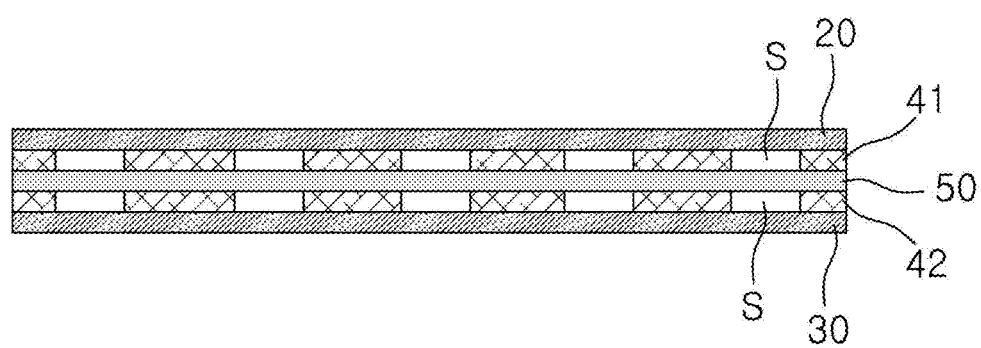
FIG. 11 is a cross-sectional view of the conductive yarn pressure sensor according to the third embodiment of the present disclosure.
Figure 12:
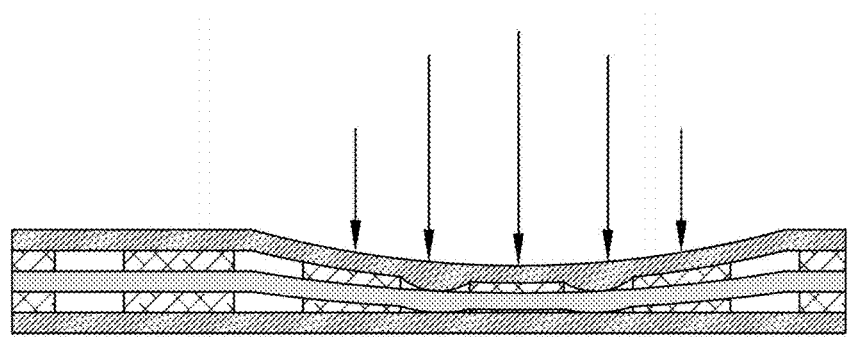
FIG. 12 is a cross-sectional view showing the action of the conductive yarn pressure sensor according to the third embodiment of the present disclosure.

FIG. 10 is an exploded perspective view of a conductive yarn pressure sensor according to a third embodiment of the present disclosure, FIG. 11 is a cross-sectional view of the conductive yarn pressure sensor according to the third embodiment of the present disclosure, and FIG. 12 is a cross-sectional view showing the action of the conductive yarn pressure sensor according to the third embodiment of the present disclosure.

The third embodiment of the present disclosure has a structure similar to that of the second embodiment described above. The first sensing electrode 20 and the second sensing electrode 30 are each brought into contact with a conductive film, rather than being brought into direct contact with each other in the spaces in the adhesive member 40, thus more effectively increasing the extent of change in the resistance of the conductive yarns and consequently increasing the sensitivity of the pressure sensor.

As shown in FIG. 10, a first adhesive member 41 is formed on one surface of the conductive film, and a second adhesive member 42 is formed on the other surface of the conductive film. The first sensing electrode 20 is stacked on the first adhesive member 41, and the second sensing electrode 30 is stacked on the second adhesive member 42.

As shown in FIGS. 11 and 12, when pressure is applied to the first sensing electrode 20 from above, the first sensing electrode 20 is naturally pressed, and thus the first sensing electrode 20 and the second sensing electrode 30 are respectively brought into contact with the conductive film in the spaces in the first adhesive member 41 and the second adhesive member 42, thus further amplifying the contact resistance value and consequently increasing the sensitivity of the pressure sensor.

Here, the conductive film may be implemented in the form of a conductive sheet. It is appropriate for the conductive film to be made of a highly conductive material so as to function as a medium capable of effectively amplifying a change in resistance by contact between the first sensing electrode 20 and the second sensing electrode 30.

Since the configuration of the first sensing electrode 20, the second sensing electrode 30, the first adhesive member 41, and the second adhesive member 42 is substantially the same as the configuration of the first sensing electrode 20, the second sensing electrode 30, and the adhesive member 40 of the first and second embodiments described above, a duplicate description thereof will be omitted.

While the present disclosure has been described in detail with reference to exemplary embodiments thereof, this is for the purpose of illustrating the present disclosure specifically, the conductive yarn pressure sensor according to the present disclosure is not limited thereto, and it will be apparent that changes and modifications may be made by those skilled in the art within the scope of the present disclosure. All such modifications and variations are intended to be included within the scope of the present disclosure, and the specific scope of protection of the present disclosure will be apparent from the appended claims.

What is claimed is:

1. A conductive yarn pressure sensor comprising:
   a first sensing electrode comprising a first surface and a plurality of first unit sensing electrodes extending in a first direction and insulated from each other, each of the plurality of first unit sensing electrodes comprising a set of first conductive yarns that are disposed on the first surface and extend in the first direction;
   a second sensing electrode comprising a second surface opposing the first surface and a plurality of second unit sensing electrodes extending in a second direction and insulated from each other, each of the plurality of second unit sensing electrodes comprising a set of second conductive yarns that are disposed on the second surface and extend in the second direction; and
   an intermediate layer interposed between the first sensing electrode and the second sensing electrode, the intermediate layer comprising a plurality of openings,
   wherein the intermediate layer is configured to enable the set of first conductive yarns of at least one of the plurality of first unit sensing electrodes of the first sensing electrode and the set of second conductive yarns of at least one of the plurality of second unit sensing electrodes of the second sensing electrode to physically contact each other through at least part of the plurality of openings in the intermediate layer in response to external pressure applied to at least one of the first sensing electrode or the second sensing electrode and sense a position, in at least one of the first sensing electrode or the second sensing electrode to which the external pressure is applied, in response to the set of first conductive yarns and the set of second conductive yarns physically contacting each other.

2. The conductive yarn pressure sensor of claim 1,
   wherein the intermediate layer comprises a porous fiber layer comprising fibers,
   wherein the plurality of openings comprise a plurality of pores formed in the porous fiber layer, and
   wherein at least part of the set of first conductive yarns of the at least one of the plurality of first unit sensing electrodes of the first sensing electrode and at least part of the set of second conductive yarns of the at least one of the plurality of second unit sensing electrodes of the second sensing electrode are configured to physically contact each other through at least part of the plurality of pores in the porous fiber layer in response to the external pressure.

3. The conductive yarn pressure sensor according to claim 2,
   wherein the plurality of first unit sensing electrodes and the plurality of second unit sensing electrodes overlap each other such that the first direction of the plurality of first unit sensing electrodes and the second direction of the plurality of second unit sensing electrodes intersect each other when viewed in a thickness direction of the conductive yarn pressure sensor.

4. The conductive yarn pressure sensor according to claim 3, wherein each of the plurality of first unit sensing electrodes of the first sensing electrode is electrically and independently connected to a first power source, and
   wherein each of the plurality of second unit sensing electrodes of the second sensing electrode is electrically and independently connected to a second power source.

5. The conductive yarn pressure sensor of claim 1,
   wherein the intermediate layer comprises an adhesive member,
   wherein the plurality of openings comprise a plurality of open spaces formed in the adhesive member, and
   wherein at least part of the first conductive yarns of the first sensing electrode and at least part of the second conductive yarns of the second sensing electrode are configured to physically contact each other through at least part of the plurality of open spaces in the adhesive member in response to the external pressure.

6. The conductive yarn pressure sensor according to claim 5,
   wherein the first sensing electrode comprises a first surface facing the adhesive member, and the second sensing electrode comprises a second surface facing the adhesive member, wherein the first sensing electrode comprises a plurality of first unit sensing electrodes extending in a first direction and insulated from each other, each of the plurality of first unit sensing electrodes comprising a set of the first conductive yarns that are disposed on the first surface and extend in the first direction, wherein the second sensing electrode comprises a plurality of second unit sensing electrodes extending in a second direction and insulated from each other, each of the plurality of second unit sensing electrodes comprising a set of the second conductive yarns that are disposed on the second surface and extend in the second direction, and wherein the plurality of first unit sensing electrodes and the plurality of second unit sensing electrodes overlap each other such that the first direction of the plurality of first unit sensing electrodes and the second direction of the plurality of second unit sensing electrodes intersect each other when viewed in a thickness direction of the conductive yarn pressure sensor.

7. The conductive yarn pressure sensor according to claim 6, wherein each of the plurality of first unit sensing electrodes of the first sensing electrode is electrically connected to a first separate independent power source, and wherein each of the plurality of second unit sensing electrodes of the second sensing electrode is electrically connected to a second separate independent power source.

8. The conductive yarn pressure sensor according to claim 5, wherein each of the plurality of open spaces in the adhesive member has a square shape and has a size of 0.4 cm to 0.5 cm and a height of 0.4 mm to 0.5 mm in a thickness direction, and wherein each of the first sensing electrode and the second sensing electrode has an overall thickness of 0.4 mm to 0.5 mm.

9. The conductive yarn pressure sensor of claim 1, further comprising:

a conductive film, wherein the intermediate layer comprises a first adhesive member comprising a plurality of first open spaces and a second adhesive member comprising a plurality of second open spaces, wherein the plurality of openings comprise the plurality of first open spaces formed in the first adhesive member and the plurality of second open spaces formed in the second adhesive member, wherein the conductive film is interposed between the first adhesive member and the second adhesive member such that;

the first adhesive member is interposed between the first sensing electrode and the conductive film, and the second adhesive member is interposed between the second sensing electrode and the conductive film, and wherein at least part of the first conductive yarns of the first sensing electrode and at least part of the second conductive yarns of the second sensing electrode are configured to physically contact the conductive film through at least part of the plurality of first open spaces in the first adhesive member and at least part of the plurality of second open spaces in the second adhesive member, respectively, in response to the external pressure such that the first sensing electrode and the second sensing electrode electrically contact each other.

10. The conductive yarn pressure sensor according to claim 9, wherein the first sensing electrode comprises a first surface facing the first adhesive member, and the second sensing electrode comprises a second surface facing the second adhesive member, wherein the first sensing electrode comprises a plurality of first unit sensing electrodes extending in a first direction and insulated from each other, each of the plurality of first unit sensing electrodes comprising a set of the first conductive yarns that are disposed on the first surface and extend in the first direction, wherein the second sensing electrode comprises a plurality of second unit sensing electrodes extending in a second direction and insulated from each other, each of the plurality of second unit sensing electrodes comprising a set of the second conductive yarns that are disposed on the second surface and extend in the second direction, and wherein the plurality of first unit sensing electrodes and the plurality of second unit sensing electrodes overlap each other such that the first direction of the plurality of first unit sensing electrodes and the second direction of the plurality of second unit sensing electrodes intersect each other when viewed in a thickness direction of the conductive yarn pressure sensor.

11. The conductive yarn pressure sensor according to claim 10, wherein each of the plurality of first unit sensing electrodes of the first sensing electrode is electrically connected to a first separate independent power source, and wherein each of the plurality of second unit sensing electrodes of the second sensing electrode is electrically connected to a second separate independent power source.

* * * * *